Patented Nov. 17, 1931

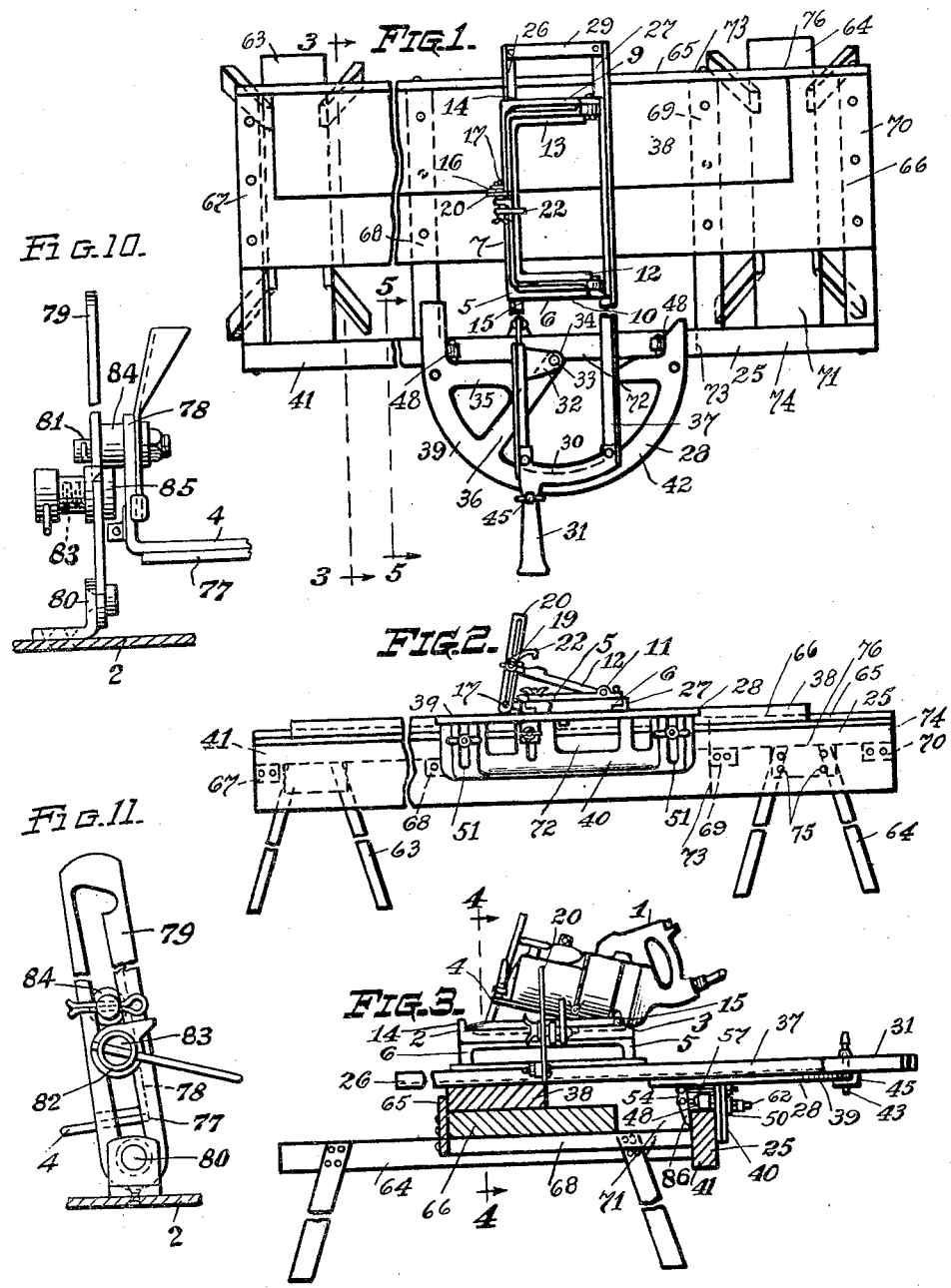

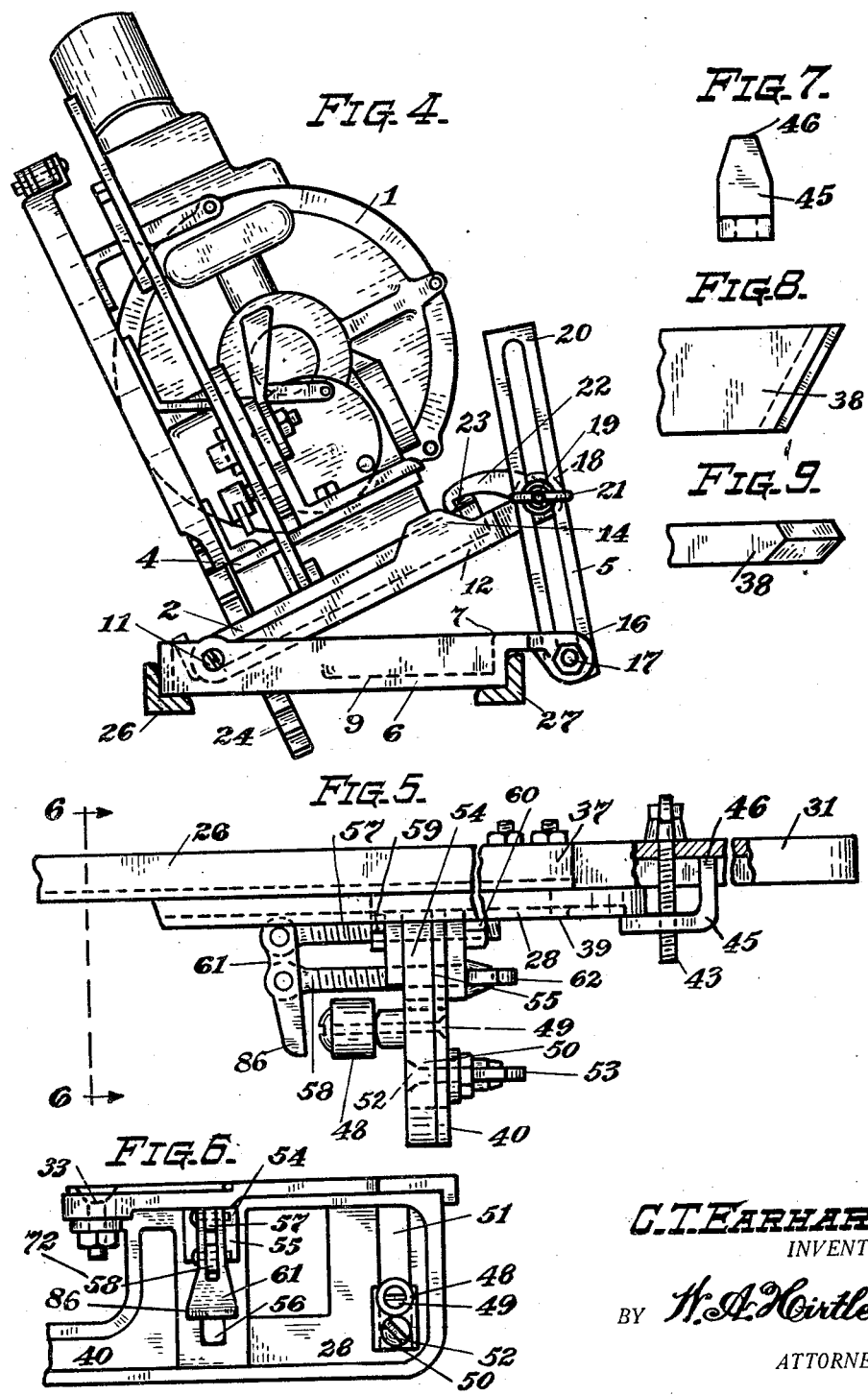

1,832,283

UNITED STATES PATENT OFFICE

CHARLES T. EARHART, OF PITTSBURGH, PENNSYLVANIA

SAWING DEVICE

Application filed August 18, 1928. Serial No. 300,559.

In the present invention, comprising sawing devices, the purpose is to provide a means of sawing beams in several directions, using a "power saw" which is preferably operated by an electric motor. For instance, a beam or plank may be sawn or cut transversely, longitudinally on a transverse cut at an angle, or other directions, as will be further explained as the description proceeds herein.

A "standard make" of saw is preferably used in connection with the present device, and by means of parts of my invention, is adapted to accomplish the above described purposes, and by means of a suitable table structure herein described, the whole device may readily be moved from one construction job to another.

In the accompanying drawings forming part of this specification is shown a complete example of the invention.

Figure 1 is a plan view of a saw holder, the movable frame, and the framing table, forming part of my invention.

Figure 2 is a front elevation of Figure 1.

Figure 3 is a transverse cross-section of Figure 1 taken on line 3—3 of Figure 1.

Figure 4 is an end view partly in section of an electric power saw, the movable frame, and saw holder, taken on line 4—4 of Figure 3.

Figure 5 is a side view, partly in section of the movable frame and associated parts, taken on line 5—5 of Figure 1.

Figure 6 is a partial rear view of Figure 5, taken from the left on line 6—6 thereof.

Figure 7 is a view taken from the left of a clamp shown in Figure 5.

Figure 8 is a plan view of the end of a piece of lumber.

Figure 9 is an edge view of Figure 8.

Figure 10 is a front detailed view of an adjustable holding means, shown in Figure 4.

Figure 11 is a side view of Figure 10, taken from the left thereof.

The saw holder will be first described, in which the numeral 1 indicates an electric saw, which has the usual base plate 2, which is hingedly mounted at 3 on the saw, and permits the elevation of the end 4 of the saw, as shown in Figure 3.

When the end 4 of the saw 1 is thus elevated, same can be held in any selected adjustable position by means of the following device. (See Figs. 10 and 11.) A rigid bottom plate 77 on the saw itself, carries the bent plate 78. A slotted bar 79 is pivotally mounted at 80 on the base plate 2, and a pintle 81 passes through the bent plate 78, and slidably rides in bar 79. At any selected point of elevation on the slotted bar 79, the bent plate 78, and hence the saw 1 itself, can be held in position, by tightening the jamming nut 82, on its bolt 83, which slidably operates in said slotted bar, the pintle washer 84 resting on the head 85 of bolt 83.

The holding and locking means just described is usually part of the regular equipment of the electric saw.

It is evident that the depth of "cut" made by the saw blade 24 is controlled by means of the adjustable holding and locking means just described, whether the saw 1, is tilted to the left as shown in Figure 4, or whether the base plate 2, is in lowered position parallel with member 9 of the bottom frame 6.

The saw holder indicated by 5 is preferably made of aluminum or other light material, and consists of a bottom frame 6, having the parts 7, 9 and 10, the latter having pivotal points 11, 11 on which are mounted the secondary frame 12, adapted to carry the saw 1 thereon. This frame 12 is provided with a shelf-like flange 13, to support the saw base plate 2, and has two extensions 14, 15 which engage the ends of said base plate 2, as seen in Figures 1 and 3. The bottom frame 6 of the saw holder has an extension 16, with a pintle 17, pivotally mounted therein, and the secondary frame 12 has an extension 18 with a lockable pintle 19, adapted to engage the slot in the slidable bar 20, as shown clearly in Figure 4. It is evident that the saw holder with its load the saw 1, can be tilted about the pintle points 11, and moreover when any desired elevation is obtained, the relation may be maintained by the lock-nut 21, and the hooked pawl 22, which last engages the lip 23 of the saw base plate 2, as shown in Figure 4.

From which description it is seen that the saw blade 24 may be made to cut at a variety of angle bevels when it is placed in the saw holder 5, and this while the bottom frame 6 is in a horizontal position on the framing table 25. From Figures 1 and 3 it is evident that the saw holder may be slidably operated along the channels or angles 26, 27 of the movable frame 28.

The movable frame 28 consists of the following parts, to wit, the before mentioned angle-bars 26, 27 which are joined at their one end by the flat bar 29, and at their opposite ends by the arc shaped casting 30, which is preferably formed integral with the operating handle 31. The angle-bar 26 carries rigidly mounted thereon the pivot plate 32, which is pivotally mounted on a pintle 33, carried by the end 34 of the radial arms 35, 36 of the movable frame. It is clear that the handle 31 will operate the angle-iron slideway frame 37 as a whole about the pintle 33, in which case the saw 1, and the saw holder 5 mounted on the slideway will take a variety of angular positions with reference to the longitudinal dimension of the framing table 25, and thus enable angular cuts to be made through the lumber 38 superimposed on the framing table 25. It will also be observed from Figure 4, that when the saw 1 is tilted as shown in said figure, by raising the frame 12 about the pivotal points 11, of the saw holder 5, that the saw blade 24, will cut a bevel under-cut in the material 38, at the same time an angular transverse cut is being made.

The movable frame also has an arc-plate 39 made of aluminum or other light material, and on which as before mentioned the radial arms 35, 36 are formed, and said arc-plate has a depending vertical limb 40 adapted to slidably operate along the stringer 41 of the framing table. The arc-plate 39 is provided with suitable graduations on its upper face at 42, and the handle 31 with the attached angle-iron slideway 37 can be locked in position on any desired graduation point by means of the screw-bolt 43, having a butterfly head thereon, and the bent metal clamp 45. This structure is best seen in Figure 5 of the drawings, in which the end 46 of the clamp engages the handle 31 on its under side, and the opposite end engages the under-side of the arc-plate 39, and when the screw-bolt is tightened the clamp locks the handle 31 in any selected position. In order to smoothly operate the movable frame 28 along the top of the stringer 41, rollers 48, 48 are provided, which are mounted revolubly on the pintles 49, which are rigidly mounted on the small castings 50. The latter slidably operate in the openings 51, 51 of the vertical limb 40, and are locked in selected vertical position by means of the threaded bolts 52, and nuts 53, 53, as is readily understood from Figures 5 and 6 of the drawings. Another feature of the movable frame is the clamping device 54, which grips the stringer 41 as shown in Figures 5, 6 and 3 clearly. A casting 55 slidably operates in the aperture 56 of the vertical limb 40, and carries a pair of screw-bolts 57, 58, the former having nuts 59, 60 for locking the bolt in selected position. Bolt 57 carries pivotally mounted thereon, the tongue-shaped casting 61, which is also pivotally connected to the bolt 58, and it is evident from the drawings that when the nut 62 is tightened the casting 61 grips the stringer 41, and secures the movable frame to the said stringer. The bottom of the tongue-shaped member 61 is widened at 86 to form a good gripping member against the stringer. From the above it is seen that the movable frame can be readily slid along the stringer 41 of the framing table 25, to any selected position and locked by the clamping device 54.

The framing table comprises the following parts. The table 25 as a whole it is seen is designed to be separate from the saw-horses 63, 64, and made portable, being readily transported from one job to another, as saw-horses are commonly used on every construction job. In other words the portability of the framing table is an important feature of this present invention. The table 25 is provided with a rear guide member, 65, which in addition to forming a holding or guide-strip for the material 38 being sawn, acts as a stringer for the table 25. It will be seen from Figures 2 and 3, that the guide strip 65 projects above the material supporting member 66. A number of cross-members 67, 68, 69, 70 join the stringer 41 and the guide-strip 65, and the part 66 is nailed to these cross-members as shown. From which it is seen that the framing table, without the saw-horses can readily be carried from place to place as a whole structure. It will be noted also that the purpose of the aperture 71 is to permit the saw 1 to be placed in retracted position on the slide way 37, over the said aperture, and then revolved about pintle 33 without hindrance, and the opening in the vertical limb 40 is also made for this purpose at 72, as required when the saw and slideway is revolved about pintle 33, in the extreme right hand position as seen in Figure 1. The purpose of having the rollers 48, 48 and the clamping device 54 vertically adjustable, is to accommodate varying thicknesses of material 38

Another feature of the present invention, is the following. It is seen that if we cut the framing table stringer 41 at 73 and nail the portion 74 to the end of the saw horse 64 at 75, and further cut the part 66, along the same line 73, and nail it to the top 76 of the saw-horse 64, we form a very much simplified table structure, which can be used for work of very short length. Which is to say, where the material to be sawn is of very short length, we can use one saw-horse, a short piece of material 66, a very short stringer 74, and omit the guide-strip 65, and cross-bars 69, and 70, and still have a structure upon which the movable frame 28 is readily mounted, thus providing a device performing the functions of the ordinary mitre-box used for sawing of short length.

From the above description, the operation of the whole device is readily understood. The electric saw 1 is superimposed in the saw holder 5, and clamped in position by the hooked pawl 22, the secondary frame of the saw holder is elevated to the desired angle of vertical inclination as in Figure 4, and locked by the nut 21 in desired angular position. This arrangement of parts will saw a bevel under-cut in the material 38, and any selected horizontal angle may be sawn across the material depending on the graduation selected on the arc-plate 39. In this way material may be sawn having an angular bevel cut across the material, or if the frame 12 is lowered a practically vertical cut at a transverse angle may be made through the material, though when a vertical cut is desired the saw 1 is merely inserted in the slideway 37 without the use of the saw-holder 5.

I claim:

1. In a movable frame, an arc-plate, a vertical limb on the arc-plate having a number of apertures therethrough, a number of rollers adjustably and lockingly mounted in said apertures, a stringer clamping device adjustably mounted in a vertical limb aperture, a pair of slideway angle-irons, pivotally mounted on the arc-plate, and means for locking the angle-iron slideway in selected positions on the arc-plate.

2. In a sawing device, a framing table having a front stringer, a movable frame slidably operating along the stringer, a vertical limb on the movable frame having a number of apertures therethrough, a pair of rollers adjustably mounted in some of the said apertures, a stringer clamping device adjustably mounted in a vertical limb aperture, an arc-plate on the vertical limb, an angle-iron slideway pivotally mounted on the arc-plate, and means for locking the slideway and the arc-plate together.

3. In a sawing device, a framing table having a pair of opposed stringers, a plurality of cross-members, and an apertured deck, a movable frame slidably mounted on the said stringers, having an angle-iron slideway pivotally mounted thereon, a vertical limb having a number of apertures through it, a pair of rollers adjustably mounted in the vertical limb apertures, a stringer clamping device mounted adjustably in a vertical limb aperture, an arc-plate on the vertical limb, a saw holder having a bottom plate, and a secondary plate hinged to the bottom plate, and means for holding the two saw holder plates a selected distance apart.

4. In a movable frame, an arc-plate, a vertical limb on the arc-plate having a number of apertures therethrough, a number of rollers adjustably and lockingly mounted in said apertures, a stringer clamping device adjustably mounted in a vertical limb aperture, a pair of slideway angle-irons, pivotally mounted on the arc-plate, and means for locking the angle-iron slideway in selected positions on the arc-plate, comprising a bent metal plate having its upper end in engagement with the operating handle, and its opposite end in engagement with the arc-plate and means for locking the bent plate in position.

5. In a sawing device, a framing table having a front stringer, a movable frame slidably operating along the stringer, a vertical limb on the movable frame having a plurality of apertures therethrough, a pair of rollers adjustably mounted in some of the said apertures, a stringer clamping device adjustably mounted in a vertical limb aperture, an arc-plate on the vertical limb, an angle-iron slideway pivotally mounted on the arc-plate, a saw holder comprising a bottom frame, a secondary frame hingedly connected to the bottom frame for holding the base plate of a power saw, a hook-shaped pawl pivotally mounted on the secondary frame and making locking engagement with the saw base plate, and means for adjustably holding the two frames a desired distance apart.

6. In a sawing device, a movable frame comprising an arc-plate, a vertical limb having a plurality of apertures therethrough, a number of rollers adjustably mounted in some of the apertures, a stringer clamping device adjustably mounted in one of the vertical limb apertures, a pair of slideway angle-irons on the arc-plate, a saw holder adapted to slidably reciprocate in the angle-irons, comprising a bottom frame, a secondary frame hinged to the bottom frame for holding the base plate of a power saw, means for locking the saw base plate and the secondary frame together, an extension formed on the bottom frame of the saw holder, a slotted bar hingedly connected to the said extension, and a locking pintle on the secondary frame in engagement with the slotted bar for holding the two frames of the saw holder a desired distance apart.

7. In a sawing device, a framing table having a front stringer, a movable frame slidably operating along the stringer, a vertical limb on the movable frame having a number of apertures therethrough, a pair of rollers adjustably mounted in some of said apertures, an arc-plate on the vertical limb, an angle-iron slideway pivotally mounted on the arc-plate, and means for locking the slideway and arc-plate together.

8. In a sawing device, a power saw having a rigid bottom plate and a base-plate hingedly mounted thereto, a framing table having a front stringer thereon, a movable frame slidably operating along the stringer, a vertical limb on the movable frame, an arc-plate on the vertical limb, and an angle-iron slideway pivotally mounted on the arc-plate, and means on the slideway adapted to receive the saw base-plate, and operate slidably therein.

9. In a sawing device, a movable frame comprising an arc-plate, a pair of slideway angle irons pivotally mounted on the arc-plate, a vertical limb on the arc-plate having a number of apertures therethrough, a number of rollers each mounted in one of said apertures, a stringer clamping device mounted in a vertical limb aperture, and a saw-holder having means for tilting in a transverse and longitudinal direction.

10. In a sawing device, a movable frame, comprising an arc-plate, a slideway formed of a pair of angle-irons pivotally mounted on the arc-plate, an arc-shaped casting on the ends of the angle-irons having a handle for operating the angle-iron slideway about its pivotal point on the arc-plate, means for locking the arc-shaped casting and the arc-plate together, and a saw-holder provided with transverse and longitudinal tilting means, reciprocally mounted in the slideway.

In testimony whereof I affix my signature.

CHARLES T. EARHART.